United States Patent [19]

Iwaya

[11] Patent Number: 5,058,489
[45] Date of Patent: Oct. 22, 1991

[54] PISTON STRUCTURE FOR INTERNAL COMBUSTION ENGINE

[75] Inventor: Naohiro Iwaya, Kanagawa, Japan

[73] Assignee: Atsugi Unisia Corporation, Kanagawa, Japan

[21] Appl. No.: 539,335

[22] Filed: Jun. 18, 1990

[30] Foreign Application Priority Data

Jun. 20, 1989 [JP] Japan .................. 1-71197[U]

[51] Int. Cl.⁵ .................................. F16J 1/04
[52] U.S. Cl. ............................... 92/233; 92/232
[58] Field of Search ............... 92/177, 209, 232, 233, 92/237

[56] References Cited

U.S. PATENT DOCUMENTS

| | | | |
|---|---|---|---|
| 2,120,019 | 6/1938 | Cooper | 92/233 X |
| 2,309,555 | 1/1943 | Venner et al. | 92/233 X |
| 2,513,814 | 7/1950 | Moore | 92/233 X |
| 4,648,309 | 3/1987 | Schellmann | 92/233 |
| 4,756,241 | 7/1988 | Sakuhara et al. | 92/233 |
| 4,831,919 | 5/1989 | Bruni | 92/233 |
| 4,856,417 | 8/1989 | Ishikawa | 92/233 |

Primary Examiner—John T. Kwon
Assistant Examiner—George Kapsalas
Attorney, Agent, or Firm—Ronald P. Kananen

[57] ABSTRACT

A piston structure for an internal combustion engine is provided. This piston includes an oval slipper skirt with a cross sectional profile in the form of an ellipse defined by preselected major and minor axes. A difference between the major and minor axes is gradually increased nearing a lower edge of the skirt. The skirt distorts from an elliptical shape to a round shape when side thrust acts on thrust surfaces of the skirt to provide uniform contact with a cylinder wall.

4 Claims, 4 Drawing Sheets

PISTON STRUCTURE FOR INTERNAL COMBUSTION ENGINE

BACKGROUND OF THE INVENTION

1. Technical Field

The present invention relates generally to a piston structure including an oval skirt, and more particularly to an improved piston structure which has an oval skirt for uniformly absorbing a side thrust acting thereon during a power stroke.

2. Background Art

For reducing a piston weight, a so-called slipper type piston is well known in the art. This piston includes a slipper skirt having first and second thrust faces diametrically opposed to each other with respect to the centerline of the piston to contact with a cylinder wall during combustion. These thrust faces are supported by ribs extending from the pin boss portions.

However, in such prior art piston structures, portions adjacent both sides of the pin boss portions are cut out to provide two skirt segments, or first and second thrust faces, each having a relatively narrow circumferential width. Each thrust face is tapered in the axial direction of the piston in the form of an elliptical cone profile defined by a preselected major axis and minor axis with a constant difference therebetween ranging from an upper portion of the skirt to a lower portion thereof. It will be noted that side portions of the skirts have a relatively high rigidity. During combustion, side thrust loads concentrate on the highly rigid portions, thereby causing the skirt to seize. The narrower the circumferential widths of the skirts, the more the piston is subject to seizure. Prior art piston structures with narrow skirt widths for reducing piston weight do not ensure endurance against seizure or severe wear, or the like.

SUMMARY OF THE INVENTION

It is accordingly one object of the present invention to avoid the disadvantages of the prior art.

It is another object of the invention to provide a light weight piston structure which has improved endurance and prevents seizure from occurring.

According to one aspect of the present invention, there is provided a piston for an internal combustion engine which comprises a piston head portion, and an oval slipper skirt portion extending from the piston head portion in the axial direction of the piston, the skirt portion including first and second segments diametrically opposed to each other with respect to the piston axis with a profile defined by a portion of an elliptical cone having preselected major and minor axes increasing toward the bottom of the skirt portion in a relationship whereby a difference between the major and minor axes increases nearing the bottom of the skirt portion.

According to another aspect of the invention, there is provided a slipper piston made of an aluminum alloy for an internal combustion engine which comprises a piston head portion, a slipper skirt portion adjacent the piston head portion, a pin boss portion provided in the slipper skirt portion, and a rib portion connecting between the slipper skirt portion and the pin boss portion. The slipper skirt portion includes thrust faces. A preselected area on each thrust face has a cross sectional profile defined by a portion of an ellipse having preselected major and minor axes. A difference between the major axis and the minor axis increases toward the bottom of the slipper skirt portion as well as both major and minor axes increasing toward the bottom of the slipper skirt.

BRIEF DESCRIPTION OF THE DRAWINGS

The present invention will be understood from the detailed description given hereinbelow and from the accompanying drawings of the preferred embodiments which are given for explanation and understanding only and are not intended to imply limitation to the invention.

DETAILED DESCRIPTION OF THE PREFERRED EMBODIMENT

Figure 1:
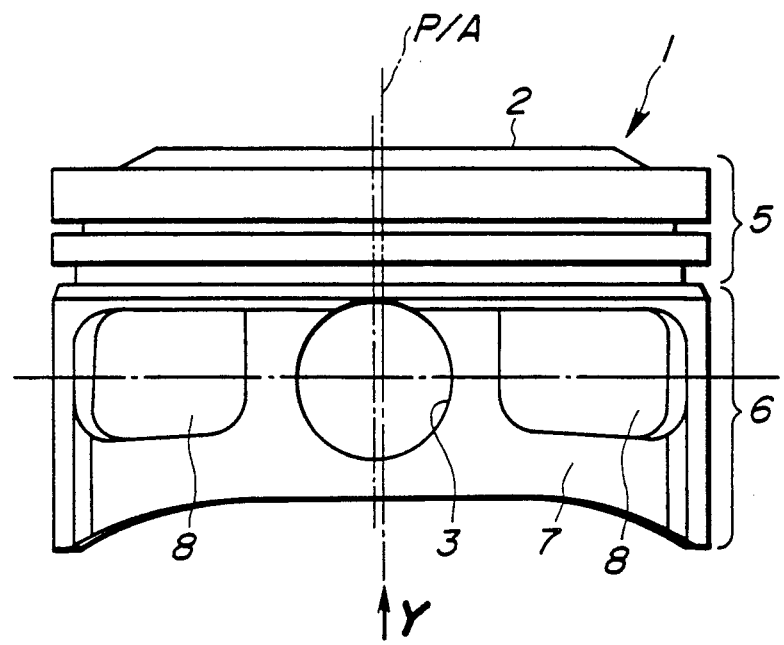
FIG. 1 is a front view which shows a piston structure according to the present invention.
Figure 2:
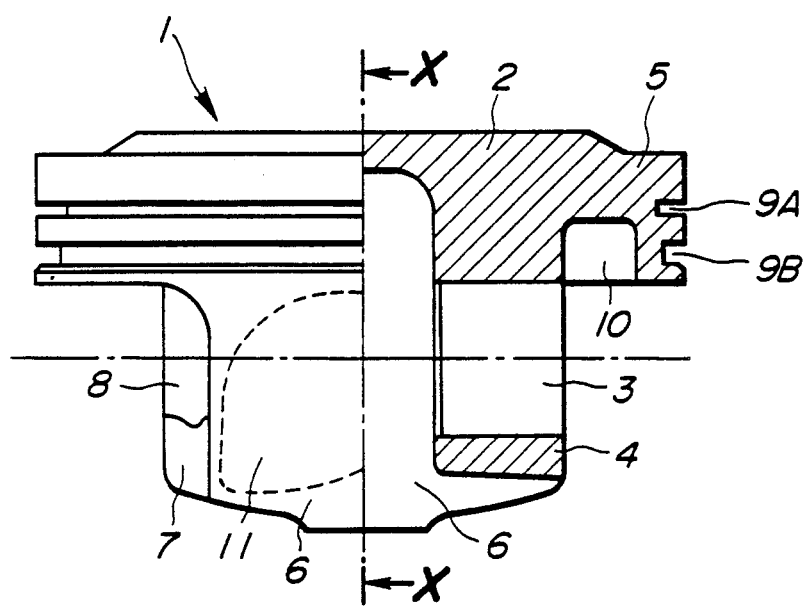
FIG. 2 is a partially cross sectional side view of the piston structure of FIG. 1.
Figure 3:
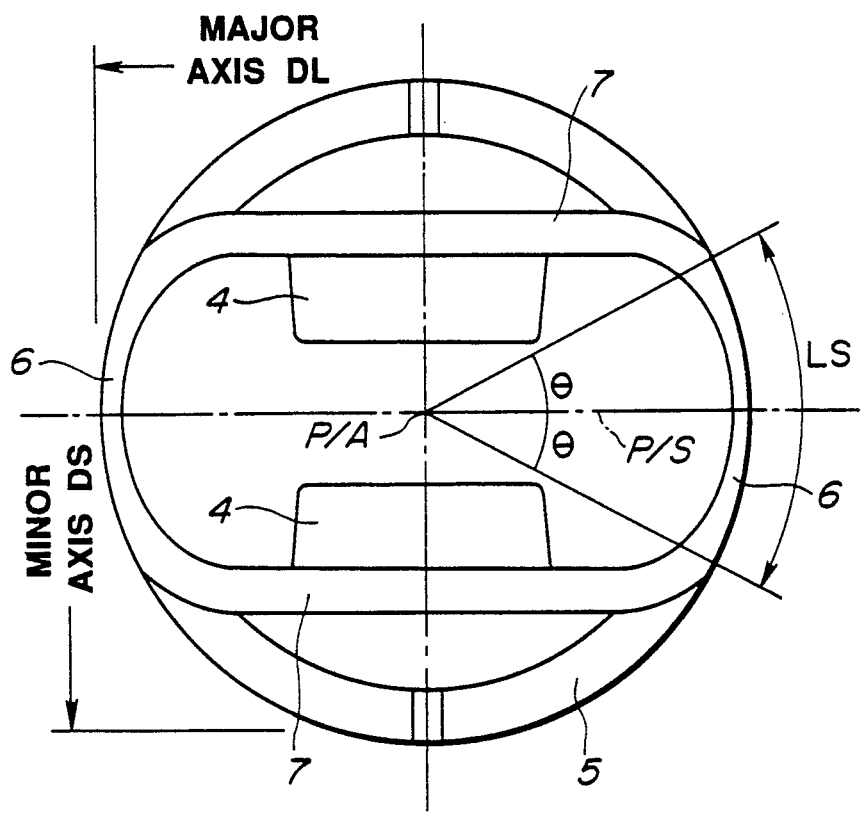
FIG. 3 is a bottom view as viewed from an arrow Y in FIG. 1.

Referring now to the drawings, wherein like numbers refer to like parts in the various views, particularly to FIGS. 1, 2, and 3, a slipper piston for an internal combustion engine according to the present invention is shown. This piston 1 is made of an aluminum alloy and includes generally a piston head portion 2, a pair of pin boss portions 4, an oval piston skirt 6, and support ribs 7. The piston skirt 6 includes two segments or thrust faces diametrically opposed to each other with respect to the piston axis to contact with a cylinder wall during combustion. The pin boss portions are integrally formed behind the piston head portion 2 in which pin bosses 3 are provided. The pin bosses 3 are diametrically opposed to each other for receiving a piston pin (not shown) to conventionally attach the piston to a connecting rod (not shown). Each pin boss 3 is slightly offset from the piston centerline P/A so that the centerline of the pin boss is spaced from the centerline P/A by a selected distance for slightly shifting location of the piston at the top dead center. The piston skirt 6 extends downwardly from the ring land portion 5. The support ribs 7 connect the pin boss portions 4 and the skirt portion 6 respectively to provide reinforcement to the piston structure. Through openings 8 are formed in the support ribs for lightening the piston weight.

Ring grooves 9A and 9B are formed in the peripheral surface of the ring land portion 5 into which piston rings (not shown) are fitted. Formed in a lower section of the piston head portion 2 are recessed portions 10 each extending behind the ring grooves 9A and 9B.

FIG. 3 is a bottom view of the piston structure as viewed from arrow Y in FIG. 1. In the drawing, the piston skirt portion 6 is shown as described hereinafter in detail. The piston skirt is defined by a portion of an ellipse within a range of a preselected outer peripheral width or an arc LS. The arc LS is defined by two angles $\theta$ with respect to a plane P/S which includes the piston centerline P/A and is perpendicular to the pin boss centerline. In this embodiment, each angle $\theta$ is set to 36°.

Figure 4:
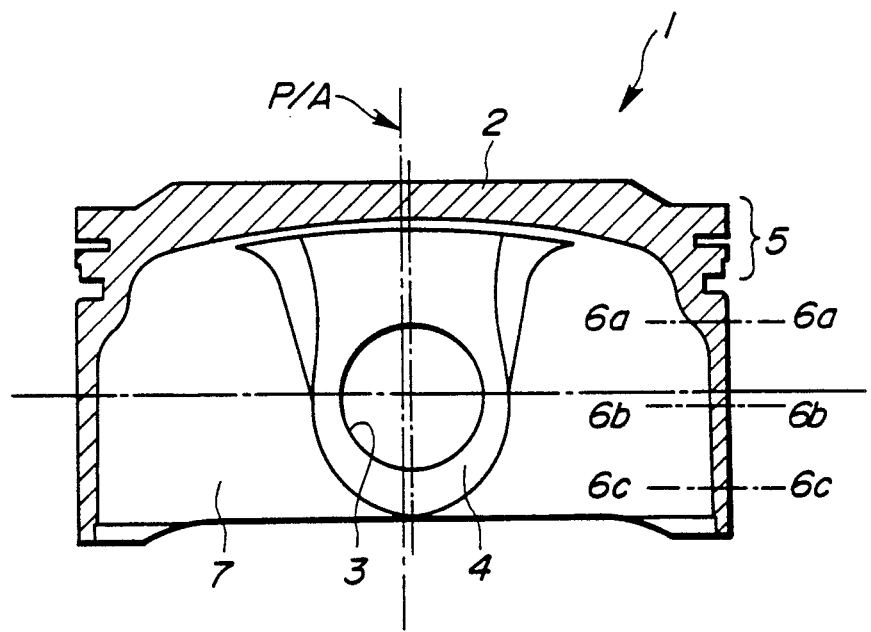
FIG. 4 is a cross sectional view taken along the line X—X in FIG. 2.
Figure 5:
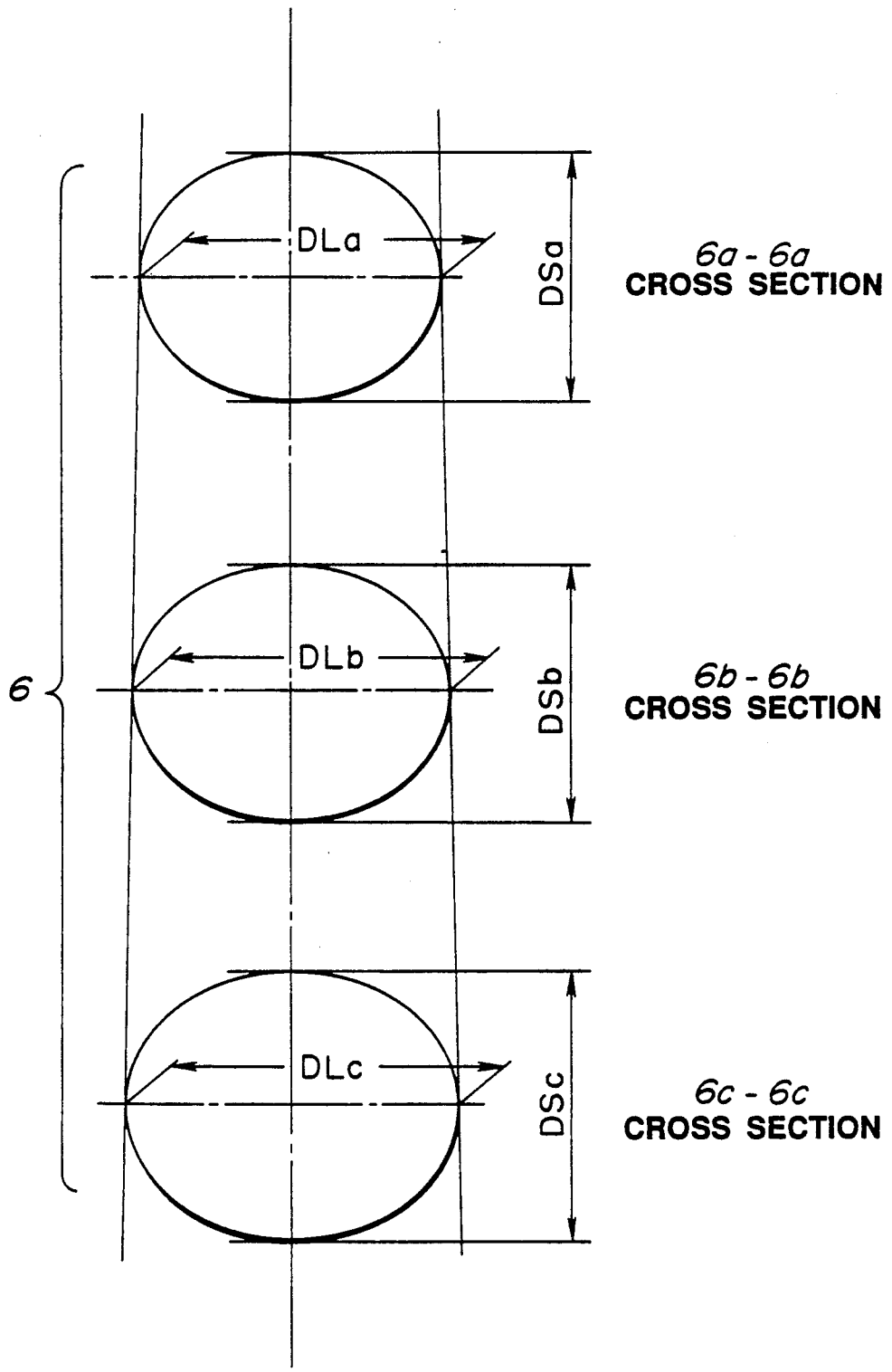
FIG. 5 is an explanatory view which shows an elliptical shape corresponding to a skirt profile according to the invention.

Referring to FIG. 5, profiles of cross sections 6a, 6b, and 6c (shown in FIG. 4) of the piston skirt portion 6 are shown. The cross sections 6a, 6b, and 6c are provided perpendicularly to the piston centerline P/A and defined in order of proximity to the ring land portion 5 as shown in FIG. 4.

Assuming that a major axis is DL, a minor axis is DS, and indexes are a, b, and c, indicating the cross sections 6a, 6b, and 6c respectively, relationships between the major axes and minor axes in elliptical shapes corresponding to the cross sections are expressed as follows:

$$DLa < DLB < DLc \tag{1}$$

$$DSa < DSb < DSc \tag{2}$$

$$DLa - DSa < DLb - DSb < DLc - DSc \tag{3}$$

It will be appreciated that the piston skirt profile within the arc section LS varies so that a difference in length between the major axis and minor axis is gradually increased ranging from an upper portion of the piston skirt to the bottom thereof in addition to an increase in length of both the major axis and the minor axis.

As will be noted by those skilled in the art, during reciprocating motion of the piston 1 in a cylinder of an engine, the piston 1 shifts abruptly from right to left to contact with a cylinder wall, a side thrust load thereby acting on the piston skirt. Usually, the side thrust reaches a maximum on a lower area of the piston skirt portions 6 adjacent the plane P/S, while it becomes gradually minimal on an upper area thereof circumferentially away from the plane P/S. With the above described piston structure, exertion of the side thrust on the piston skirt portions causes it to be deformed from an elliptical shape to a round shape, resulting in a uniform contact with the cylinder wall.

Therefore, a great shock locally acting on the piston skirt portion 6 due to side thrust is absorbed and a substantially uniform pressure acts on all piston areas contacting the cylinder wall. It will be noted that pressure distribution corresponds to the contact area 11 shown by a dotted line as shown in FIG. 2. Thus, despite the small circumferential surfaces or thrust faces of the piston skirt portion 6, they effectively support the piston against side thrust, preventing the piston skirt portion from seizing.

Figure 6:
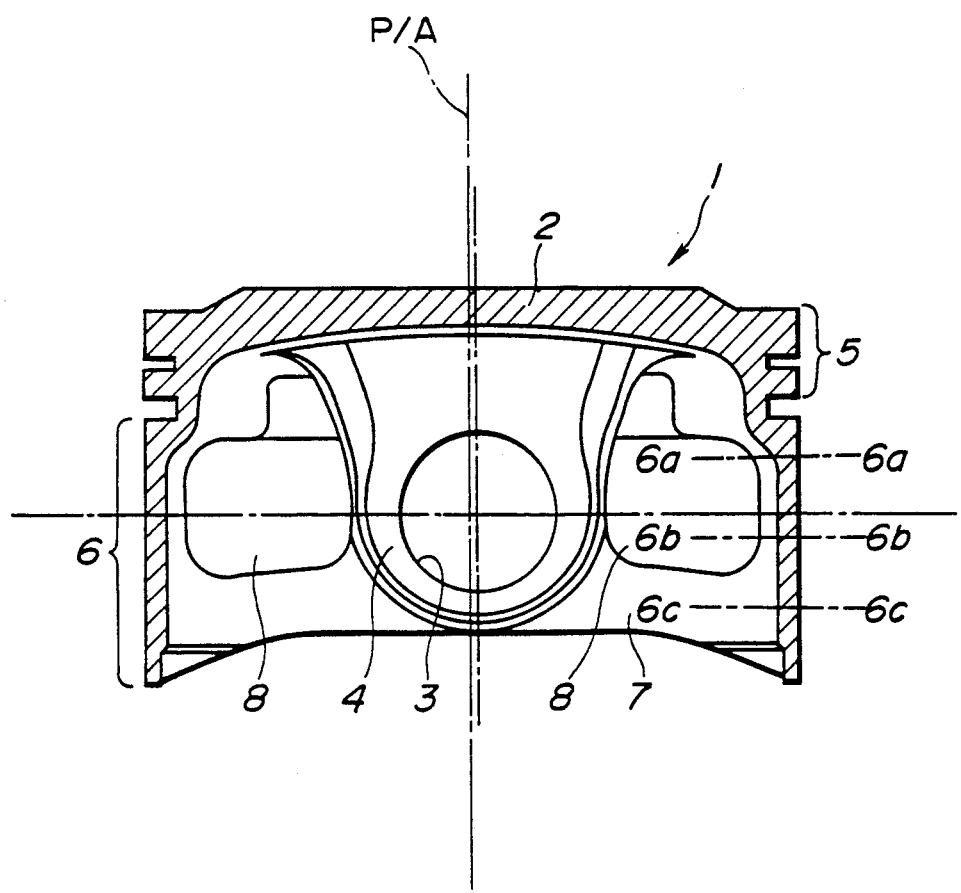
FIG. 6 is a cross sectional side view which shows an alternative embodiment according to the invention.

Referring to FIG. 6, an alternative embodiment of a piston structure is shown. Unlike the above embodiment, this piston 1 includes no through openings 8 in the ribs for lightening piston weight. In this embodiment, the thickness of the ribs 7 is adjusted for lightening the piston weight. otherwise, the structure of the piston is essentially the same as the first embodiment and thus will not be described again here.

According to research by the inventor of this invention, in a case where the ratio of the piston skirt length portion (i.e., the arc LS×2) to the circumference of the piston is 0.34:1 or less (i.e., the angle $\theta < 30.6°$), when a difference between the major axis and the minor axis of the piston skirt profile is constant, seizure may occur on the piston skirt portion. On the other hand, in the case of a piston according to the invention, which has a gradually varied difference between the major and minor axes, no seizure will occur on the piston skirt portion.

Additionally, in a case where the above mentioned ratio of a piston is from 0.34:1 to 0.4:1 (i.e., $30.6° < \theta < 36°$), when the difference between the major and minor axes is constant, no seizure occurs on the piston skirt, but great shock due to side thrust acts locally on the piston skirt. The piston structure of the invention has no such disadvantage.

Further, in a case of a piston having a ratio of 0.4:1 or more (i.e., $\theta < 36°$), when the difference between the major and minor axes is constant, no seizure occurs. Similarly, the piston of the invention has no such drawback.

As is clear from the above, the piston of the invention has an oval skirt wherein a circumferential length of the skirt is less than a preselected ratio relative to the entire circumferential length of the piston and a difference between a major axis and a minor axis of the oval skirt profile is set to a minimum at an upper portion adjacent the ring land portion while it is set to a maximum at a bottom portion thereof. It will be appreciated that the piston of the invention is very light and ensures the skirt from seizing to provide long life and proper endurance.

While the present invention has been disclosed in terms of the preferred embodiment in order to facilitate better understanding thereof, it should be appreciated that the invention can be embodied in various ways without departing from the principle thereof. Therefore, the invention should be understood to include all possible embodiments and modifications to shown embodiments which can be embodied without departing from the principle of the invention as set out in the appended claims.

What is claimed is:

1. A piston for an internal combustion engine comprising:
   a piston head portion; and
   an oval slipper skirt portion extending from said piston head portion in an axial direction along an axis of the piston, said skirt portion including first and second segments diametrically opposed to each other with respect to the piston axis with a profile defined by a portion of an elliptical cone having preselected major and minor axes increasing toward the bottom of the skirt portion in a relation whereby a difference between the major and minor axes increases nearing the bottom of the skirt portion.

2. A piston as set forth in claim 1, wherein a ratio of the circumferential length of the skirt portion to the circumferential length of the piston is 0.4:1 or less.

3. A slipper piston made of an aluminum alloy for an internal combustion engine comprising:
   a piston head portion;
   a slipper skirt portion adjacent said piston head portion;
   a pin boss portion provided in said slipper skirt portion; and
   a rib portion connecting between said slipper skirt portion and said pin boss portion,
   said slipper skirt portion including thrust faces, a preselected area on each thrust face having a cross sectional profile defined by a portion of an ellipse having preselected major and minor axes, a difference between the major axis and the minor axis increasing toward the bottom of the slipper skirt portion as well as both major and minor axes increasing toward the bottom of the slipper skirt.

4. A slipper piston as set forth in claim 3, wherein a circumferential length of the preselected areas of the thrust faces is less than 4/10 of the entire circumferential length of the piston.

* * * * *